United States Patent [19]

Saito

[11] Patent Number: 4,938,915

[45] Date of Patent: Jul. 3, 1990

[54] METHOD OF RECORDING AT LEAST TERNARY DATA ON OPTOMAGNETIC RECORDING MEDIUM HAVING A PLURALITY OF MAGNETIC LAYERS

[75] Inventor: Ichiro Saito, Kawasaki, Japan

[73] Assignee: Canon Kabushiki Kaisha, Tokyo, Japan

[21] Appl. No.: 328,705

[22] Filed: Mar. 27, 1989

Related U.S. Application Data

[63] Continuation of Ser. No. 29,888, Mar. 25, 1987, abandoned.

[30] Foreign Application Priority Data

Mar. 27, 1986 [JP] Japan .................................. 61-67240
Mar. 28, 1986 [JP] Japan .................................. 61-68795

[51] Int. Cl.$^5$ ........................ G11B 11/12; G11B 13/04
[52] U.S. Cl. ........................................ 369/13; 360/59; 369/116
[58] Field of Search ................. 369/13, 102, 124, 116; 360/59, 114, 134; 365/122, 32, 10

[56] References Cited

U.S. PATENT DOCUMENTS

| | | | |
|---|---|---|---|
| 4,151,602 | 4/1979 | Haisma et al. | 365/32 |
| 4,202,022 | 5/1980 | Imamura et al. | 360/114 |
| 4,556,291 | 12/1985 | Chen | 365/122 |
| 4,612,587 | 9/1986 | Kaneko et al. | 369/13 |
| 4,701,881 | 10/1987 | Tanaka et al. | 365/122 |

FOREIGN PATENT DOCUMENTS

| | | | |
|---|---|---|---|
| 0051296 | 5/1982 | European Pat. Off. | |
| 58-50639 | 3/1983 | Japan | 369/13 |
| 58-57646 | 4/1983 | Japan | 360/114 |
| 58-171738 | 10/1983 | Japan | 369/13 |
| 61-03324 | 1/1986 | Japan | 369/59 |

OTHER PUBLICATIONS

Nikon, "Magneto-Optic Memories Begin to Look Like a Good Bet", Electroncs/Apr. 16, 1987, p. 33.
Tanaka, the Japanese Patent Abstract, vol. 6, No. 34, p. 104 (912), Mar. 2, 1982.
Mizutani (I), the Japanese Patent Abstract, vol. 9, No. 86, p. 349 (1809), Apr. 16, 1985.
Mizutani (II), the Japanese Patent Abstract, vol. 9, No. 8, p. 349 (1809), Apr. 16, 1985.

*Primary Examiner*—Steven L. Stephan
*Assistant Examiner*—Hoa Nguyen
*Attorney, Agent, or Firm*—Fitzpatrick, Cella, Harper & Scinto

[57] ABSTRACT

A method of recording at least ternary data on an optomagnetic recording medium having at least a first magnetic layer, and a second magnetic layer whose Curie temperature is higher than that of the first magnetic layer and which is capable of being magnetization inverted independently of the first magnetic layer, the method including the steps of aligning directions of magnetization of the first and second magnetic layers of the medium in a predetermined direction; and radiating a single light beam whose power is adjusted in accordance with the data so as to obtain one of a first level, a second level higher than the first level, and a third level lower than the first and second levels, while applying a bias magnetic field in a direction opposite to the predetermined direction, wherein only the direction of the first magnetic layer of the medium is inverted when a power of the light beam is in the first level, the directions of the first and second magnetic layers are inverted when the power of the light beam is in the second level, and the directions of the first and second magnetic layers are not inverted when the power of the light beam is in the third level.

5 Claims, 3 Drawing Sheets

METHOD OF RECORDING AT LEAST TERNARY DATA ON OPTOMAGNETIC RECORDING MEDIUM HAVING A PLURALITY OF MAGNETIC LAYERS

This application is a continuation of application Ser. No. 07/029,888 filed March 25, 1987 now abandoned.

BACKGROUND OF THE INVENTION

1. Field of the Invention

The present invention relates to a method of recording data by radiating light beams, such as a laser beam onto an optomagnetic recording medium having a magnetic film.

2. Related Background Art

Recently, extensive studies have been made for optical memory elements as high-density, large-capacity memory elements using laser beams. An optomagnetic recording method received a great deal of attention as a rewritable recording method. The optomagnetic recording medium used in this method is expected to find use as a rewritable optical memory element.

As typical materials for constituting an optomagnetic recording layer of an optomagnetic recording medium used in such optomagnetic recording method, MnBi materials, garnet materials, rare earth-transition metal amorphous materials, and the like, are known. Since the MnBi materials have high Curie temperatures, they require a high-power laser for recording, and have many grain-boundary noise components. Therefore, high-S/N recording cannot be performed. Since the garnet materials have high light transmittances, they require a high-power laser for recording. The rare earth-transition metal amorphous materials have low Curie temperatures and relatively small light transmittances. Thus, they are expected to compensate for the formers' drawbacks.

A technique of this type will be described in more detail with reference to the drawings.

Figure 1:
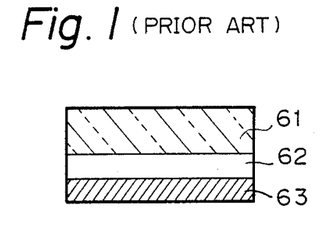
FIGS. 1 and 2 are sectional views showing structures of optomagnetic recording media used in a conventional method.

FIG. 1 is a sectional view illustrating a typical conventional optomagnetic recording medium.

In FIG. 1, a light-transmitting substrate 61 consists of a plastic material such as polymethylmethacrylate (PMMA), polycarbonate (PC), or the like, or a glass or the like, and normally has a planar shape such as a doughnut shape. An intermediate layer 62 consists of SiO, $SiO_2$, AlN, ZnS, or the like. An optomagnetic recording layer 63 normally consists of a rare earth-transition metal amorphous material such as TbFe, GdTbFe, TbFeCo, or the like, for the above reasons. A reproduction/erase operation is performed as follows.

The recording medium is magnetized in a given direction perpendicular to the substrate 61, and a laser beam is radiated from the side of the substrate 61 to form a laser spot thereon. The direction of magnetization can be an arbitrary direction if it is constant. The laser beam radiated on the substrate 61 is transmitted through the substrate 61 and the intermediate layer 62, to reach the optomagnetic recording layer 63. As a result, light absorption occurs on an irradiated portion of the optomagnetic recording layer 63 irradiated with the laser beam and the temperature locally increases. Thus, the temperature of the irradiated portion reaches the Curie temperature, and its coercive force is decreased. At this time, if a bias magnetic field is applied to the portion of the optomagnetic recording layer 63 where the coercive force is decreased, in a direction opposite to the direction of magnetization, the direction of magnetization of that portion is inverted, and an inverted magnetic domain having a direction of magnetization different from that of a non-irradiated portion is formed thereon, thus recording data. Data can be erased as follows. A laser beam is again radiated on the recorded portion of the optomagnetic recording layer 63 to increase the temperature near the Curie temperature. A bias magnetic field is applied to the recorded portion in a direction opposite to that in the recording mode so as to restore the direction of magnetization to a state before recording. In the recording/erase operation, the film thickness of the intermediate layer 62 is selected to be a thickness that can effect a reflection preventive function with respect to a wavelength of the laser beam to be applied. Thus, an increase in temperature on the optomagnetic recording layer 63 can be effectively utilized for recording and erasing operations.

Data can be reproduced as follows. A laser beam with decreased power that cannot cause a temperature rise to the Curie temperature is radiated from the side of the substrate 61, and then the direction of magnetization of the recorded portion is read out by utilizing the magnetic Kerr effect.

Figure 2:
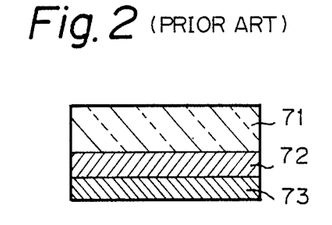

As shown in FIG. 2, a multi-layered structure consisting of a high-coercive force layer 73 having a low Curie point and a high coercive force and a low-coercive force layer 72 a high Curie point and a low coercive force has been proposed in IEEE Transactions on Magnetics, Vol. MAG-17, No. 6, November 1981, and the like. In this structure, bits recorded on the high-coercive force layer 73 are transferred to the low-coercive force layer 72 by exchange interaction or magnetostatic interaction acting therebetween, in the same manner as in the prior art shown in FIG. 1, thereby recording identical data bits on these two layers. Reproduction utilizes the Kerr effect in the low-coercive force layer 72. In this manner, a layer corresponding to the recording layer (high-coercive force layer 73) and a layer corresponding to a readout layer (low-coercive force layer 72) are separately arranged, thereby improving recording sensitivity and read characteristics.

However, the conventional optomagnetic recording methods described above are binary digital recording methods. The directions of magnetization of bits correspond to "1" or "0" signals, respectively. In this method, a bit length or track pitch must be reduced in order to increase recording density, but such reduction is limited in favor of cross-talk prevention or due to optical limitations of beam spot size.

Studies have also been made for a method of performing analog recording. However, a C/N (carrier-to-noise) ratio is not satisfactorily high, and such a method cannot be used in practical applications.

SUMMARY OF THE INVENTION

It is an object of the present invention to provide an optomagnetic recording method capable of recording data at a higher density and of reproducing recorded data at a high S/N ratio.

The above object of the present invention can be achieved in such a manner that data of at least three levels (i.e. at least ternary data) is recorded on an optomagnetic recording medium at least comprising a first magnetic layer, and a second magnetic layer having a higher Curie temperature than that of the first magnetic layer and capable of being inverted independently of the first magnetic layer, through the following steps:

aligning directions of magnetization of the first and second magnetic layers of the medium in a predetermined direction;

radiating a light beam having energy of a first level on a portion of the medium while applying a bias magnetic field thereto in a direction opposite to the predetermined direction, thereby inverting the direction of magnetization of the first magnetic layer corresponding to this portion; and radiating a light beam having energy of a second level higher than that of the first level on another portion of the medium while applying a bias magnetic field thereto in a direction opposite to the predetermined direction, thereby inverting the directions of magnetization of the first and second magnetic layers corresponding to the other portion.

DETAILED DESCRIPTION OF THE PREFERRED EMBODIMENTS

An embodiment of the present invention will be described hereinafter with reference to the accompanying drawings.

Figure 3:
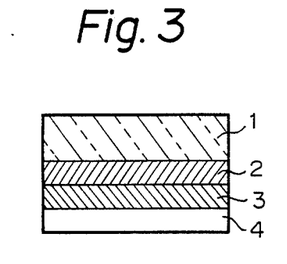
FIG. 3 is a sectional view showing a structure of an embodiment of an optomagnetic recording medium that can be used in the method of the present invention.

FIG. 3 is a sectional view showing the structure of an embodiment of an optomagnetic recording medium used in the method of the present invention. In FIG. 3, a light-transmitting substrate 1 consists of a material selected from various materials such as glass, PMMA, polycarbonate, and the like, and is not limited to a specific shape, but has a desired shape.

First and second magnetic layers 2 and 3 have magnetic anisotropy in a direction perpendicular to their surfaces, and are capable of providing an optomagnetic effect. The layers 2 and 3 have magnetooptical hysteresis loops of an identical sensitivity. More specifically, if the directions of magnetization on the two layers are identical, the rotational directions of the Kerr rotational angles are also identical. Furthermore, the first and second magnetic layers 2 and 3 must satisfy the following requirements. More specifically, if optomagnetic recording is performed under the conditions of maximum powers P1 and P2 (P1<P2) of a laser used in the recording method of the present invention and a bias magnetic field strength HB used in the method of the present invention, data can be recorded on the first magnetic layer 2 under the first recording condition (P1 and HB) (that is, the temperature of the first magnetic layer is locally increased upon layer radiation of power P1, the coercive force of that portion is decreased, and the direction of the magnetic field is inverted upon application of the bias magnetic field HB), but no data can be recorded on the second magnetic layer 3. Under the second recording condition (P2 and HB), data can be recorded on both the first and second magnetic layers 2 and 3.

Note that P1 normally falls within the range of 3 mW to 6 mW, and HB falls within the range of 50 Oe to 2,000 Oe. P2 is set to be higher than P1 by 3 mW to 6 mW.

In order to cause the first and second magnetic layers 2 and 3 to satisfy the above requirements, the components of materials, the Curie points of the layers determined by the composition, and the film thicknesses of the layers can be appropriately selected by taking the laser powers P1 and P2 and the bias magnetic field strength HB into consideration. Although depending on the laser powers P1 and P2 and the bias magnetic field HB, and other conditions, rare earth-transition metal amorphous materials such as DyFe, GdCo, GdFe, TbFe, GdTbFe, TbFeCo, GdTbFeCo, TbDyFe, GdDyFe, and the like suitable for the materials of the first and second magnetic layers 2 and 3 having the same sensitivity characteristics are used, the Curie point of the first magnetic layer 2 preferably falls within the range of 80° C. to 180° C., the film thickness falls within the range of 100 Å to 300 Å, the Curie point of the second magnetic layer 3 preferably falls within the range of 150° C. to 250° C., and its film thickness falls within the range of 150 Å to 10,000 Å, in order to cause the first and second magnetic layers 2 and 3 to satisfy the above requirements. When bits are unstably held due to exchange coupling between the magnetic layers, a dielectric layer may be arranged between the first and second magnetic layers 2 and 3. Note that the first and second magnetic layers 2 and 3 may not only consist of the same type of materials having different compositions, but may also consist of different magnetic materials.

The above conditions can be represented as follows. More specifically, if the Curie temperatures of the first and second magnetic layers are given as T1 and T2, and the coercive force near room temperature of the first and second magnetic layers are given as H1 and H2, and a magnetic force acting on the two layers due to exchange interaction and/or magnetostatic interaction is given as H, the following relations are established:

$$T1 < T2 \quad (1)$$

$$H1, H2 > H \quad (2)$$

The condition of relation (2) is a condition where the magnetization of the first and second magnetic layers is stably coerced independently at room temperature. In general, since the magnetic force by magnetostatic interaction is much smaller than the coercive force of the magnetic layer, H can be considered as follows by taking only the exchange interaction into consideration:

$$H = (\delta w)/(2Msh) \quad (3)$$

where $\delta w$ is the magnetic domain wall energy between two layers, and Ms and h are, respectively, saturated magnetization of the layer influenced by the magnetic force and film thickness.

A protective layer 4 in FIG. 3 is arranged for the purpose of anti-oxidation of the first and second magnetic layers 2 and 3, and consists of: an organic polymeric film; a film of an inorganic material such as an oxide, sulfide, or the like; or a film of a metal material or the like. In this invention, the protective layer 4 need not always be necessary. However, with this layer, oxidation and corrosion of the first and second magnetic layers 2 and 3 can be prevented.

As a typical method of forming the first and second magnetic layers 2 and 3 and the protective layer 4 on the substrate 1, film formation methods such as the deposition method, the CVD method, the sputtering method, the ion plating method, and the like can be adopted.

The recording method of the present invention that can be achieved by using the optomagnetic recording medium will be described with reference to FIGS. 4 to 6. A magnetic field in a given direction is applied to the optomagnetic recording medium shown in FIG. 3 to uniformly magnetize the first and second magnetic layers 2 and 3 upward. Thereafter, the laser beam whose power changes by three steps (0, P1, and P2 (P1<P2)) is radiated from the side of the substrate 1, as shown in FIG. 5A, and at the same time, the bias magnetic field HB is applied in the direction from the substrate 1 to the protective layer 4. As a result, in a portion irradiated with the laser power P1, the direction of magnetization of the first magnetic layer 2 is inverted. In a portion irradiated with the laser power P2, the directions of magnetization of the first and second magnetic layers 2 and 3 are inverted. The recording operation is performed such that the magnetization vectors are oriented as indicated by the arrows shown in FIG. 5B.

The type of readout signal obtained from the recorded medium upon recording will be described with reference to FIGS. 4 and 6. FIG. 4 shows a change in the Kerr rotational angle upon inversion of magnetization.

Figure 4:
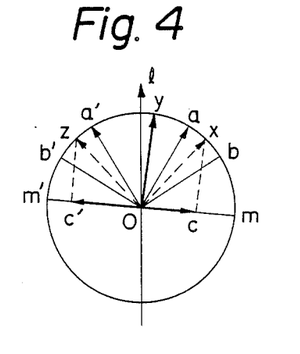
FIG. 4 is a representation showing a change in Kerr rotational angle in the medium shown in FIG. 3 on which data is recorded by the method of the present invention.
Figure 5A:
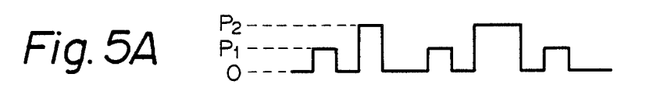
FIGS. 5A, 5B and 5C are views explaining recording-/reproducing steps of data on the medium shown in FIG. 3.
Figure 5B:
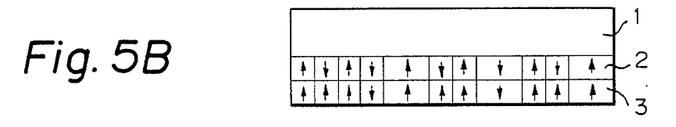

In FIG. 4, when linearly polarized light which is vibrated along the 0l axis is radiated onto the first megnetic layer, if the magnetization of this layer is oriented upward, light reflected thereby has a plane of polarization which is rotated clockwise by the Kerr rotational angle $\theta k1$ (0a). If the magnetization is oriented downward, the plane of polarization is rotated counterclockwise by the angle $\theta k1$ (0a').

Since the first and second magnetic layers 2 and 3 have hysteresis loops of the same sensitivity level, if the same linearly polarized light as above is radiated onto the second magnetic layer 3, the plane of polarization is rotated clockwise by the angle $\theta k2$ (0b) when the magnetization of this layer is oriented upward. If the magnetization of this layer is oriented downward, the plane of polarization is rotated counterclockwise by the angle $\theta k2$ (0b'). If the identically linearly polarized light is radiated on the multilayered structure of the first and second magnetic layers 2 and 3, the rotational state of the plane of polarization of light reflected by this structure is determined by the rotational states of the respective layers. FIG. 6 shows the Kerr rotational angle $\theta k$ (ordinate) of light refected by the structure with respect to a film thickness t (abscissa) of the first magnetic layer 2 when the laser beam is radiated on multilayered structures wherein first magnetic layers 2 having various thicknesses are formed on the uniform second magnetic layer 3 having a relatively large thickness (the Kerr angle of which is given by $\theta k2$). Curve A represents a case wherein the directions of magnetization of both the magnetic layers are oriented upward, curve B represents a case wherein the directions of magnetization are opposite to each other, and curve C represents a case wherein the laser beam is radiated on the structure having the downward oriented magnetization.

In this graph, in the curve A, if $t=0$, $\theta k$ is equal to $\theta k2$ from the second magnetic layer. As t increases, $\theta k$ is decreased upon interference between the first and second magnetic layers. If t exceeds a given thickness, no light can reach the second magnetic layer. Therefore, $\theta k$ becomes about $\theta k1$ (i.e., converted to $\theta k$ from the first magnetic layer). Similarly, this also applies to the curve C. In the curve B, if $t=0$, $\theta k = \theta k2$. If t increases, the Kerr rotational angles of the first and second magnetic layers have opposite phases, $\theta k$ is more abruptly decreased than in the case of the curve A, and behaves, as shown in FIG. 6, due to the interference. If $t=N$, $\theta k=0$ due to the interference. Therefore, if $t=N$, then $\theta k = \theta k1$ in the curve A, $\theta k=0$ in the curve B, and $\theta k = -\theta k1$ in the curve C.

Figure 5C:
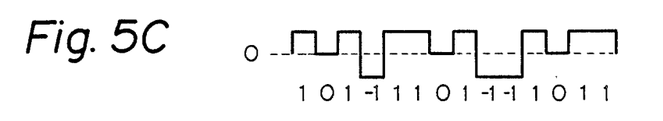
Figure 6:
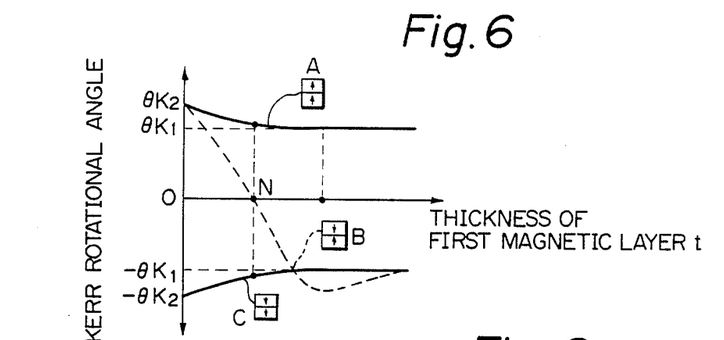
FIG. 6 is a graph showing the relationship between the film thickness of a first magnetic layer in the medium shown in FIG. 3 and the Kerr rotational angle.

For example, as can be seen from FIG. 6, if the film thickness of the first magnetic layer 2 is smaller than N in FIG. 6, the plane of polarization is rotated clockwise (0x) in FIG. 4 when the directions of magnetization of the first and second magnetic layers 2 and 3 are oriented upward, is rotated clockwise (0y) when the directions of magnetization of the layers 2 and 3 are oriented downward and upward, respectively, and is rotated counterclockwise (0z) when the directions of magnetization of the layers 2 and 3 are oriented downward. If an analyzer is arranged in a direction m-0-m' perpendicular to 0y, output signals therefrom are proportional to 0C, 0, and 0C', respectively. If "−1", "0" and "1" data signals are defined corresponding to reproduction signal levels, three-value (or ternary) data can be recorded. Therefore, in the optomagnetic recording medium in which magnetization vectors are oriented as shown in FIG. 5B, output signals as shown in FIG. 5C can be obtained. In the recording method of the present invention, since three-value data can be recorded, data volume can be increased more than in the case of binary recording.

In particular, as shown in FIG. 6, if the film thickness of the first magnetic layer 2 is set to be N, the Kerr rotational angle from the state in which only the first magnetic layer 2 is inverted apparently becomes zero, and the levels of output signals 0C and 0C' are substantially equal to each other. Thus, three-value recording with good signal quality can be performed.

Conditions for carrying out the recording method of the present invention will be described below. Assume that both magnetic layers are heated to a temperature T1' near the Curie temperature T1 of the first magnetic layer upon irradiation of a laser beam of power P1 (light beam having energy of the first level), and both the magnetic layers are heated to a temperature T2' near the Curie temperature T2 of the second magnetic layer upon irradiation of laser beam of power P2 (light beam having energy of the second level). If the coercive forces of the first and second magnetic layers at temperature T1' are given as H1' and H2', respectively, and the coercive forces thereof at temperature T2' are given as H1" and H2", respectively, the bias magnetic field HB is:

$$H1' < HB < H2' \quad (4)$$

$$H1'', H2'' < HB \quad (5)$$

In the above description, the case has been exemplified wherein the medium is used which comprises two layers having magnetooptical hysteresis loops of the same sensitivity level. The present invention can be applied to a medium which comprises two layers having hysteresis loops of opposite sensitivity levels. This case will be described below.

Figure 7:
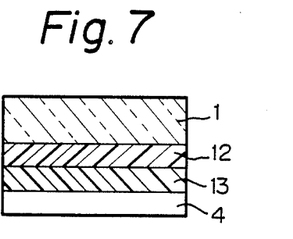
FIG. 7 is a sectional view showing a structure of another embodiment of an optomagnetic recording medium that can be used in the method of the present invention.

FIG. 7 is a sectional view showing the structure of another embodiment of an optomagnetic recording medium used in the method of the present invention. In FIG. 7, the same substrate 1 and the same protective layer 4 as in FIG. 3 are used. First and second magnetic layers 12 and 13 have magnetic anisotropy in a direction perpendicular to their surfaces, and are capable of providing the optomagnetic effect. The layers 12 and 13 have magnetooptical hysteresis loops of opposite sensitivity levels. More specifically, if the directions of magnetization on these layers are the same for each other, the rotational direction of the Kerr rotational angles are opposite to each other.

As the material of the magnetic layer, rare earth transition metal amorphous materials, such as TbFe, GdCo, GdFe, DyFe, GdTbFe, TbFeCo, GdTbFeCo, TbDyFe, GdDyFe, and the like are preferably used. In this case, one magnetic layer is preferably formed as a magnetic layer (transition metal rich layer) having a higher transition metal content than that of the compensation composition, and the other magnetic layer is preferably formed as a magnetic layer (rare earth metal rich layer) having a higher rare earth metal content than that of the compensation composition. The first and second magnatic layers 12 and 13 can consist of materials of the same type having different compositions or can consist of different magnetic materials.

The first and second magnetic layers must satisfy the same requirements as those of the medium shown in FIG. 3. More specifically, if optomagnetic recording is performed under the conditions of maximum powers P1 and P2 (P1 < P2) of a laser used in the recording method of the present invention and a bias magnetic field strength HB used in the method of the present invention, data can be recorded on the first magnetic layer 12 under the first recording condition (P1 and HB) (that is, the temperature of the first magnetic layer is locally increased upon laser radiation power of P1, the coercive force of that portion is decreased, and the direction of the magnetic field is inverted upon application of the bias magnetic field HB), but no data can be recorded on the second magnetic layer 13. Under the second recording condition (P2 and HB), data can be recorded on both the first and second magnetic layers 12 and 13.

The first and second magnetic layers 12 and 13 satisfy relations (1) to (3), and the preferable structure of the medium such as film thickness, Curie temperature, and the like and the preferable recording conditions such as P1, P2, HB, and the like are the same as those in the case of the medium shown in FIG. 3. The medium shown in FIG. 7 can be prepared by the same method as that of the medium shown in FIG. 3.

The recording method of the present invention that can be achieved by using the optomagnetic recording medium shown in FIG. 7 will be described with reference to FIGS. 8 to 10. A magnetic field in a given direction is applied to the optomagnetic recording medium shown in FIG. 7 to uniformly magnetize the first and second magnetic layers 12 and 13 upward. Thereafter, a laser beam whose power changes by three steps (0, P1, P2 (P1 < P2)) is radiated from the side of the substrate 1, as shown in FIG. 9A, and at the same time, the bias magnetic field HB is applied in the direction from the substrate 1 to the protective layer 4. As a result, in a portion irradiated with the laser power P1, the direction of magnetization of the first magnetic layer 12 is inverted. In a portion irradiated with the laser power P2, the directions of magnetization of the first and second magnetic layers 12 and 13 are inverted. The recording operation is performed such that the magnetization vectors are oriented as indicated by arrows in FIG. 9B.

The type of readout signal obtained from this recording medium upon recording will be explained with reference to FIGS. 8 and 10. FIG. 8 shows a change in Kerr rotational angle upon inversion of magnetization. Assume that the first magnetic layer 12 is a rare earth rich rare earth-transition metal amorphous layer, and the second magnetic layer 13 is a transition metal rich rare earth-transition metal amorphous layer, so that the layers 12 and 13 exhibit magnetooptical hysteresis loops having opposite sensitivity levels. In this case, in FIG. 8, when linearly polarized light vibrating along the 0( axis is radiated on the first magnetic layer, if the direction of magnetization of this layer is oriented upward, light reflected thereby has a plane of polarization which is rotated counterclockwise by the Kerr rotational angle $\theta k1$ (0a'). If the direction of magnetization is oriented downward, the plane of polarization is rotated clockwise by the angle $\theta k1$ (0a).

Since the first and second magnetic layers 12 and 13 have hysteresis loops of opposite sensitivity levels, if the same linearly polarized light is radiated on the second magnetic layer 13, the plane of polarization is rotated clockwise by the angle $\theta k2$ (0b) if the direction of magnetization of this layer is oriented upward. If the direction of magnetization is oriented downward, the plane of polarization is rotated counterclockwise by the angle $\theta k2$ (0b'). If the same linearly polarized light is radiated onto the multi-layered structure of the first and second magnetic layers 12 and 13, the rotational state of the plane of polarization of light reflected by this structure is determined by the rotational states of the respective layers. FIG. 10 shows the Kerr rotational angle $\theta k$ (ordinate) of light reflected by the structure with respect to a film thickness t (abscissa) of the first magnetic layer 12 when the laser beam is radiated on multi-layered structures wherein first magnetic layers 12 having various thicknesses are formed on the uniform second magnetic layer 13 having a relatively large thickness (the Kerr angle of which is given by θk2). Curve A represents a case wherein the directions of magnetization of both the magnetic layers are oriented downward, curve B represents a case wherein the directions of magnetization are opposite to each other, and curve C represents a case wherein the laser beam is radiated on the structure having the upward oriented magnetization.

Figure 8:
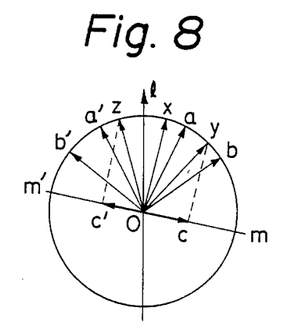
FIG. 8 is a representation showing a change in Kerr rotational angle in the medium shown in FIG. 7 on which data is recorded by the method of the present invention.
Figure 9A:
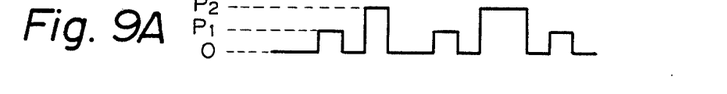
FIGS. 9A, 9B and 9C are views explaining recording-/reproducing steps of data on the medium shown in FIG. 7.
Figure 9B:
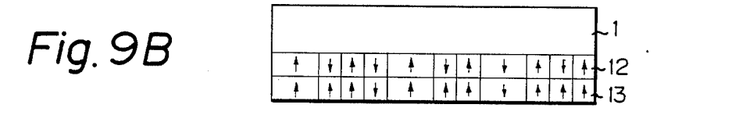
Figure 9C:
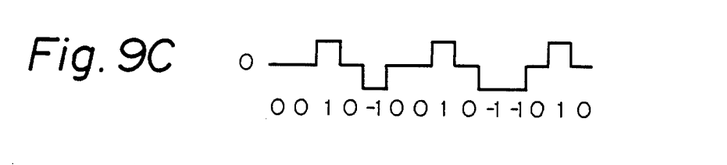
Figure 10:
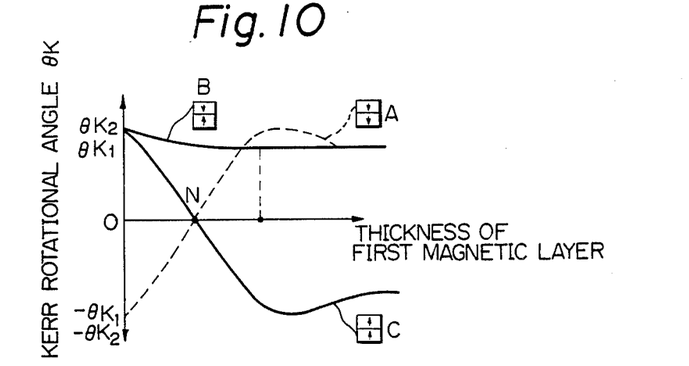
FIG. 10 is a graph showing the relationship between the film thickness of a first magnetic layer in the medium shown in FIG. 7 and the Kerr rotational angle.

For example, if the film thickness of the first magnetic layer 12 is smaller than N shown in FIG. 10, when the directions of magnetization of the first and second magnetic layers 12 and 13 are oriented upward, the plane of polarization is rotated clockwise (0x) in FIG. 8. As can be seen from FIG. 10, if the directions of magnetization of the layers 12 and 13 are respectively oriented downward and upward, the plane of polarization is rotated clockwise (0y). In addition, if the directions of magnetization of the layers 12 and 13 are oriented downward, the plane of polarization is rotated counterclockwise (0z). If an analyzer is arranged in a direction m-0-m' perpendicular to 0x, output signals therefrom are proportional to 0C, 0 and 0C', respectively. If "−1", "0", and "1" data signals are defined in corresponding to reproduction signal levels, three-value data (or ternary) can be recorded. Therefore, in the optomagnetic recording medium in which magnetization vectors are oriented as shown in FIG. 9B, output signals as shown in FIG. 9C can be obtained. The recording conditions represented by relations (4) and (5) are the same as those in the case of using the medium shown in FIG. 3.

Detailed examples of the present invention will be described below.

Example 1

Figure 11:
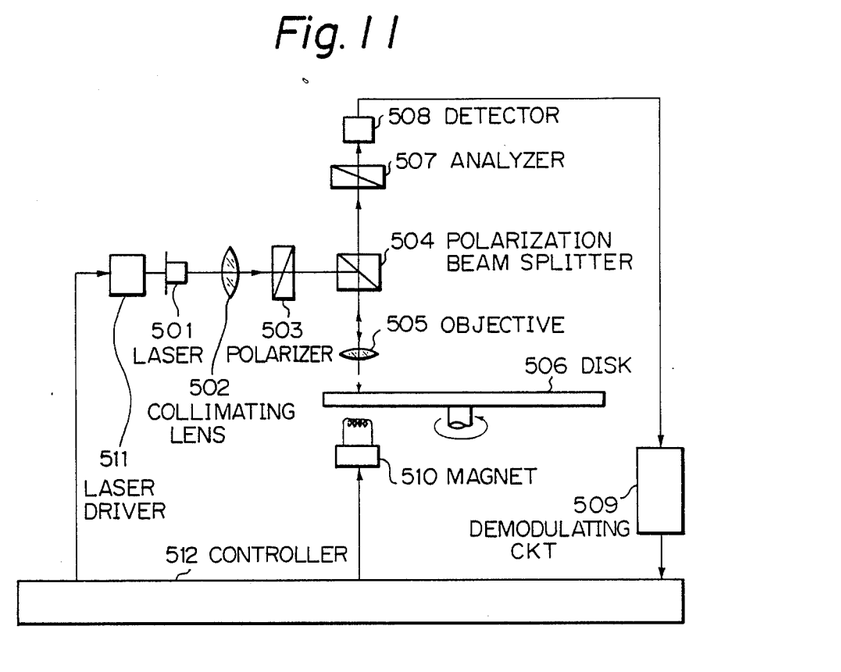
FIG. 11 is a diagram showing an arrangement of an optomagnetic recording/reproduction apparatus that can be used in the method of the present invention.

An optomagnetic recording medium as shown in FIG. 3 was prepared as follows. A 120-Å GdTbFeCo thin film as the first magnetic layer 2, and a 500-Å GdTbFeCo thin film as the second magnetic layer 3 were sequentially formed on the glass substrate 1 by the sputtering method, respectively. The recording method of the present invention was conducted using the optomagnetic recording medium thus prepared. FIG. 11 shows an example of an apparatus embodying the method of the present invention used in this case.

The apparatus shown in FIG. 11 includes a semiconductor laser 501 capable of modulating power. Laser beam emitted from the semiconductor laser 501 is radiated onto an optomagnetic recording medium 506 through a collimating lens 502 for converting the laser beam into the parallel beam, a polarizer 503 for converting the laser beam into linearly a polarized beam, a polarization beam splitter 504 for guiding the beam from the laser 501 to the medium 506, and an objective lens 505 for focusing the laser beam. The beam reflected by the medium 506 is guided to a detector 508 through the objective lens 505 the beam splitter 504, and an analyzer 507, and is converted to an electrical signal by a modulating circuit 509. This apparatus also includes a recording/erase bias magnetic field generation coil 510, a laser driver 511 for modulating the power of the laser 501, and a controller 512 for controlling the operations of the above-mentioned components.

The recording operation was performed under the conditions of laser power $P1=5$ $mW$, $P2=10$ $mW$, a recording frequency of 500 kHz, a rotational speed of the substrate of 1,200 rpm, and a bias magnetic field of 200 Oe. Data recorded on the optomagnetic recording medium under these conditions was reproduced upon application of laser power of 1.5 mW. In this case, $Vpp=150$ $mV$, $Vpp=0$ $mV$, and $Vpp=-150$ $mV$ were obtained, and three-value recording corresponding to "+1", "0" and "−1" could be performed.

Example 2

An optomagnetic recording medium as shown in FIG. 7 was prepared as follows. A 100-Å $Tb_{0.26}Fe_{0.74}$ thin film (rare earth rich) as the first magnetic layer 2, a 600-Å $Tb_{0.17}Fe_{0.79}Co_{0.04}$ thin film (transition metal rich) as the second magnetic layer 13, and a 3,000-Å $Si_3N_4$ thin film as the protective layer 4 were sequentially formed on the glass substrate 1 by the sputtering method, respectively. The recording method of the present invention was conducted by the apparatus shown in FIG. 11 using the optomagnetic recording medium thus prepared.

The recording operation was performed under the conditions of laser power $P1=5$ $mW$, $P2=10$ $mW$, a recording frequency of 500 kHz, a rotational speed of the substrate of 1,200 rpm, and a bias magnetic field of 200 Oe. Data recorded on the optomagnetic recording medium under these conditions was reproduced upon application of laser power of 1.5 mW. In this case, $Vpp=120$ $mV$, $Vpp=0$ $mV$, and $Vpp=-120$ $mV$ were obtained, and three-value recording corresponding to "+1", "0" and "−1" could be performed Various other applications of the present invention may be made in addition to the above embodiments. The present invention includes such applications within the scope of the appended claims of the invention.

1. A method of recording at least ternary data on an optomagnetic recording medium comprising at least a first magnetic layer, and a second magnetic layer having a Curie temperature higher than that of the first magnetic layer and capable of being magnetization inverted independently of the first magnetic layer, said method comprising the steps of:
   aligning directions of magnetization of the first and second magnetic layers of the medium in a predetermined direction; and
   radiating the medium with a single light beam whose power is adjusted in accordance with the data so as to obtain energy of a first level, a second level higher than the first level, and a third level lower than the first and second levels, while applying a bias magnetic field in a direction opposite to the predetermined direction, wherein only the direction of the first magnetic layer of the medium is inverted when the power of the light beam is in the first level, the directions of the first and second magnetic layers are inverted when the power of the light beam is in the second level, and the directions of the first and second magnetic layers are not inverted when the power of the light beam is in the third level.

2. A method according to claim 1, wherein the first and second magnetic layers have magnetooptical hysteresis loops of the same sensitivity level.

3. A method according to claim 1, wherein the first and second magnetic layers have magnetooptical hysteresis loops of opposite sensitivity levels.

4. A method according to claim 1, wherein the first and second magnetic layers each has coercive force larger than a magnetic force acting therebetween at room temperature.

5. A method according to claim 1, further comprising the steps of locally heating the medium to a temperature T1' near the Curie temperature of the first magnetic layer upon irradiation of the light beam having energy of the first level and heating an irradiated portion of the medium to a temperature T2' near the Curie temperature of the second magnetic layer upon irradiation of the light beam having energy of the second level.

* * * * *

UNITED STATES PATENT AND TRADEMARK OFFICE
CERTIFICATE OF CORRECTION

PATENT NO. : 4,938,915
DATED : July 3, 1990
INVENTOR(S) : Ichiro Saito

It is certified that error appears in the above-identified patent and that said Letters Patent is hereby corrected as shown below:

COLUMN 2

Line 29, "a" (first occurrence) should read --having a--.

COLUMN 5

Line 40, "the" should read --a--; and
Line 59, "meg-" should read --mag- --.

COLUMN 6

Line 12, "refected" should read --reflected--.

COLUMN 7

Line 55, "magnatic" should read --magnetic--.

COLUMN 8

Line 45, "0(" should read --0$\ell$--.

UNITED STATES PATENT AND TRADEMARK OFFICE
CERTIFICATE OF CORRECTION

PATENT NO. : 4,938,915
DATED : July 3, 1990
INVENTOR(S) : Ichiro Saito

It is certified that error appears in the above-identified patent and that said Letters Patent is hereby corrected as shown below:

COLUMN 9

Line 27, "in" should be deleted;
    Line 28, "data (or ternary)" should read --(or ternary) data--;
    Line 50, "Laser" should read --A laser--; and
    Line 60, "lens 505" should read --lens 505,--.

COLUMN 10

Line 31, "performed" should read --performed.--.

Signed and Sealed this

Fifth Day of January, 1993

Attest:

DOUGLAS B. COMER

*Attesting Officer*    *Acting Commissioner of Patents and Trademarks*